US010484621B2

(12) United States Patent
Adsumilli et al.

(10) Patent No.: US 10,484,621 B2
(45) Date of Patent: Nov. 19, 2019

(54) SYSTEMS AND METHODS FOR COMPRESSING VIDEO CONTENT

(71) Applicant: GoPro, Inc., Carlsbad, CA (US)

(72) Inventors: Balineedu Chowdary Adsumilli, San Francisco, CA (US); Adeel Abbas, Carlsbad, CA (US); David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 298 days.

(21) Appl. No.: 15/414,403

(22) Filed: Jan. 24, 2017

(65) Prior Publication Data

US 2017/0251208 A1 Aug. 31, 2017

Related U.S. Application Data

(60) Provisional application No. 62/301,553, filed on Feb. 29, 2016.

(51) Int. Cl.
*H04N 5/247* (2006.01)
*G06T 3/20* (2006.01)
(Continued)

(52) U.S. Cl.
CPC ............... *H04N 5/247* (2013.01); *G06T 3/20* (2013.01); *H04N 5/23238* (2013.01);
(Continued)

(58) Field of Classification Search
CPC ........ H04N 5/247; H04N 19/36; H04N 19/85; H04N 19/167; H04N 19/17; H04N 19/597;
(Continued)

(56) References Cited

U.S. PATENT DOCUMENTS

| 5,649,032 A | 7/1997 | Burt et al. |
| 6,389,179 B1 | 5/2002 | Katayama et al. |

(Continued)

FOREIGN PATENT DOCUMENTS

WO WO-2017127816 A1 * 7/2017 ............ H04N 5/247

OTHER PUBLICATIONS

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.
(Continued)

*Primary Examiner* — Tat C Chio
(74) *Attorney, Agent, or Firm* — Gazdzinski & Associates, PC

(57) ABSTRACT

Systems and methods for providing imaging content using spatially varying encoding quality. Imaging content may be acquired using spherical lenses (e.g., fisheye). When viewing spherical imaging content, spherical to planar image transformations may be utilized. Such transformations (e.g., equirectangular) may be characterized by spatially varying image distortion. Transformed images may be encoded. Encoding process may be configured based on spatially varying encoding quality. Encoding quality may be configured based on the transformation such that portions of the transformed image characterized by greater distortion may be encoded using lower quality (e.g. greater QP values); portions of the transformed image characterized by lower distortion may be encoded using greater quality (e.g. lower QP values). Such encoding may produce a bitstream characterized by a lower bitrate for a given quality and/or better quality for a given bitrate as compared to an encoding process that may apply a uniform encoding quality.

20 Claims, 6 Drawing Sheets

(51) Int. Cl.
   H04N 19/124    (2014.01)
   H04N 5/232     (2006.01)
   H04N 19/597    (2014.01)
   H04N 19/17     (2014.01)
   H04N 19/167    (2014.01)
   H04N 19/85     (2014.01)
   H04N 19/36     (2014.01)
   G06T 19/00     (2011.01)

(52) U.S. Cl.
   CPC ......... *H04N 19/124* (2014.11); *H04N 19/167* (2014.11); *H04N 19/17* (2014.11); *H04N 19/36* (2014.11); *H04N 19/597* (2014.11); *H04N 19/85* (2014.11); *G06T 19/006* (2013.01)

(58) Field of Classification Search
   CPC .... H04N 19/124; H04N 5/23238; G06T 3/20; G06T 19/006
   See application file for complete search history.

(56) References Cited

U.S. PATENT DOCUMENTS

| | | | |
|---|---|---|---|
| 8,606,073 | B2 | 12/2013 | Woodman |
| 9,171,577 | B1 | 10/2015 | Newman et al. |
| 9,277,122 | B1 | 3/2016 | Imura et al. |
| 9,355,433 | B1 | 5/2016 | Adsumilli et al. |
| 9,369,689 | B1 | 6/2016 | Tran et al. |
| 9,575,803 | B2 | 2/2017 | Chauvet et al. |
| 2003/0007567 | A1 | 1/2003 | Newman et al. |
| 2003/0035047 | A1 | 2/2003 | Katayama et al. |
| 2005/0226483 | A1 | 10/2005 | Geiger et al. |
| 2006/0256397 | A1 | 11/2006 | Cui |
| 2006/0268131 | A1 | 11/2006 | Cutler |
| 2007/0025723 | A1 | 2/2007 | Baudisch et al. |
| 2007/0064800 | A1 | 3/2007 | Ha |
| 2007/0237420 | A1 | 10/2007 | Steedly et al. |
| 2012/0242788 | A1 | 9/2012 | Chuang et al. |
| 2012/0307000 | A1 | 12/2012 | Doepke et al. |
| 2014/0218354 | A1 | 8/2014 | Park et al. |
| 2015/0065803 | A1 | 3/2015 | Douglas et al. |
| 2015/0109468 | A1 | 4/2015 | Laroia et al. |
| 2015/0124877 | A1 | 5/2015 | Choi et al. |
| 2015/0138311 | A1 | 5/2015 | Towndrow |
| 2015/0249813 | A1 | 9/2015 | Cole et al. |
| 2015/0341552 | A1 | 11/2015 | Chen et al. |
| 2015/0341557 | A1 | 11/2015 | Chapdelaine-Couture et al. |
| 2015/0346832 | A1 | 12/2015 | Cole et al. |
| 2016/0012855 | A1 | 1/2016 | Krishnan |
| 2016/0065947 | A1 | 3/2016 | Cole et al. |
| 2016/0112705 | A1* | 4/2016 | Mukherjee ........... H04N 19/597 375/240.18 |
| 2016/0142697 | A1 | 5/2016 | Budagavi et al. |
| 2016/0241892 | A1 | 8/2016 | Cole et al. |
| 2016/0253795 | A1 | 9/2016 | Cole et al. |
| 2016/0274338 | A1 | 9/2016 | Davies et al. |
| 2016/0295128 | A1 | 10/2016 | Schnittman et al. |
| 2017/0094278 | A1* | 3/2017 | Bickerstaff ........... G06T 3/0018 |

OTHER PUBLICATIONS

Allène C., et al., "Seamless Image-based Texture Atlases Using Multi-band Blending," Pattern Recognition, 2008. ICPR 2008. 19th International Conference on, 2008.
Badrinarayanan V., et al., "Segnet: a Deep Convolutional Encoder-Decoder Architecture for Image Segmentation," arXiv preprint arXiv:1511.00561, 2015.
Barghout L. and Sheynin J., "Real-world scene perception and perceptual organization: Lessons from Computer Vision". Journal of Vision, 2013, vol. 13 (9). (Abstract).
Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.
Bay H., et al., "Surf: Speeded up Robust Features," European Conference on Computer Vision, Springer Berlin Heidelberg, 2006, pp. 404-417.
Beier et al., "Feature-Based Image Metamorphosis," in Computer Graphics Journal, Jul. 1992, vol. 26 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., "A Multiresolution Spline with Application to Image Mosaics," in ACM Transactions on Graphics (TOG), 1983, vol. 2, No. 4, pp. 217-236.
Chan T.F. and Vese LA., "Active contours without edges". IEEE Transactions on Image Processing, 2001, 10 (2), pp. 266-277 (hereinafter "Chan").
Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.
Elen, "Whatever happened to Ambisonics" AudioMedia Magazine, Nov. 1991.
Gracias, et al., "Fast Image Blending Using Watersheds and Graph Cuts," Image and Vision Computing, 2009, vol. 27 (5), pp. 597-607.
Grois, et al., "Efficient Adaptive Bit-Rate Control for ROI Scalable Video Coding", Workshop on Picture Coding and Image Processing 2010; Dec. 7, 2010-Dec. 7, 2010; Nagoya, Dec. 7, 2010 (Dec. 7, 2010), XP030082089.
Grois, et al., "Recent Advances in Region-of-Interest Video Coding" In: "Recent Advances on Video Coding", Jul. 5, 2011 (Jul. 5, 2011), InTech, XP055257835, ISBN: 978-953-30-7181-7 DOI: 10.5772/17789.
H.264 (Jan. 2012) and/or ISO/IEC 14496L 10:2012, Information technology L Coding of audioL visual objects L Part 10: Advanced Video Coding.
H.265 (Dec. 2016) also known as High Efficiency Video Code (HVEC),(described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015.
Herbst E., et al., "Occlusion Reasoning for Temporal Interpolation Using Optical Flow," Department of Computer Science and Engineering, University of Washington, Tech. Rep. UW-CSE-09-08-01, 2009.
Ichimura D., et al., "Slice Group Map for Mult. Interactive ROI Seal", 17. JVT Meeting; 74. MPEG Meeting; Oct. 14, 2005-Oct. 21, 2005; Nice, FR;(Joint Video Team of ISO/IEC JTC1/SC29/WG11 and ITU-T SG.16 ), No. JVT-Q020r1, Oct. 14, 2005 (Oct. 14, 2005), XP030006183, ISSN: 0000-0413.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-l 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., "Inter Frame Coding with Template Matching Averaging," in IEEE International Conference on Image Processing Proceedings (2007), vol. (III), pp. 409-412.

(56) References Cited

OTHER PUBLICATIONS

Szeliski R., "Computer vision: algorithms and applications," Springer Science & Business Media, 2010.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Ugur. et al.,"MV-HEVC/SHVC HLS: On default Output Layer Sets", Jan. 2014.

Vass, J., et al., "Efficient Three-Dimensional Wavelet Codecs for Networked Video Communication," in Proceedings of IEEE International Conference on Image Processing, Kobe, Japan, Oct. 1999, pp. 565-569.

Won, et al., "Size-Controllable Region-of-Interest in Scalable Image Representation", IEEE Transactions on Image Processing, IEEE Service Center, Piscataway, NJ, US, vol. 20, No. 5, May 1, 2011 (May 1, 2011 ), pp. 1273-1280, XPO 11411787, ISSN: 1057-7149, DOI: 10.1109/TIP.2010.2090534.

Xiao, et al., "Multiple View Semantic Segmentation for Street View Images," 2009 IEEE 12th International Conference on Computer Vision, 2009, pp. 686-693.

Xiong Y., et al., "Gradient Domain Image Blending and Implementation on Mobile Devices," International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

\* cited by examiner

SYSTEMS AND METHODS FOR COMPRESSING VIDEO CONTENT

PRIORITY

This application claims the benefit of priority to U.S. Provisional Patent Application Ser. No. 62/301,553 filed Feb. 29, 2016 of the same title, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to the storing and/or the presenting of image and/or video content.

Description of Related Art

Virtual reality (VR) video content and/or panoramic video content may include bitstreams characterized by high resolution and data rates (e.g., 8192×4096 at 60 frames per second in excess of 100 megabits per second (mbps)). Users may be viewing high data rate content on a resource limited device (e.g., battery operated computer (e.g., a tablet, a smartphone)) and/or other device that may be characterized by a given amount of available energy, data transmission bandwidth, and/or computational capacity. Resources available to such resource limited device may prove inadequate for receiving and/or decoding full resolution and/or full frame image content.

SUMMARY

The present disclosure satisfies the foregoing needs by providing, inter alfa, methods and apparatus for provision of captured content in a manner that addresses the processing capabilities of a resource limited device.

In a first aspect of the present disclosure, a system for providing imaging content is disclosed. In one embodiment, the system includes an electronic storage configured to store a sequence of images of a first frame resolution; a communications interface configured to communicate a bit stream associated with the stored sequence of images to a client device; and one or more physical processors configured to execute a plurality of computer readable instructions, the plurality of computer readable instructions when executed by the one or more physical processors is configured to: access one or more source images, individual source images of the one or more source images characterized by a spherical field of view; transform the one or more source images into a planar image using a spherical to planar transformation; obtain a spatial quality distribution for image encoding based on the spherical to planar transformation; and encode the planar image using the spatial quality distribution such that: one or more portions of the planar image are encoded at a first quality; and one or more other portions of the planar image are encoded at a second quality, the second quality being greater than the first quality.

In one variant, the spherical to planar transformation includes an equirectangular projection.

In another variant, the planar image comprises an equatorial line that resides near the middle of a latitudinal dimension of the planar image; and the one or more other portions of the planar image that are encoded at the second quality are disposed more proximate the equatorial line than the one or more portions of the planar image that are encoded at the first quality.

In yet another variant, the first quality and the second quality are effectuated by the utilization of a quantization parameter (QP) for the encoded planar image; and the second quality is characterized by a lower QP value as compared with a higher QP value for the first quality.

In yet another variant, the one or more source images are obtained using a plurality of image capturing devices, the plurality of image capturing devices are configured to obtain panoramic content.

In yet another variant, the higher QP value is configured to reduce a transmission bitrate as compared with the transmission of a non-encoded planar image that does not utilize the spatial quality distribution.

In yet another variant, the one or more source images are obtained using a plurality of image capturing devices, the plurality of image capturing devices are configured to obtain panoramic content.

In yet another variant, the plurality of computer readable instructions when executed by the one or more physical processors is further configured to: receive a current viewport position for a user viewing the obtained panoramic content; and provide the one or more other portions of the planar image at the second quality, the second quality being greater than the first quality. The one or more other portions of the planar image are representative of the current viewport position.

In yet another variant, the one or more portions of the planar image that are encoded at the first quality represent portions of the image that are not associated with the current viewport position for the user.

In a second aspect, a method for providing imaging content is disclosed. In one embodiment, the method includes accessing a planar image characterized by a spatially varying image distortion parameter; obtaining a spatial quality distribution for encoding of the planar image based on the spatially varying image distortion parameter; and encoding the planar image using the spatial quality distribution such that: one or more portions of the planar image are encoded at a first quality; one or more other portions of the planar image are encoded at a second quality, the second quality being greater than the first quality.

In one variant, the method further includes obtaining one or more source images; and transforming the one or more source images into the planar image.

In another variant, the method further includes transmitting the encoded planar image, the transmitted encoded planar image characterized by a lower bitrate for a given quality as compared with the transmission of the planar image using an encoding process that applies a uniform encoding quality to the planar image.

In yet another variant, the method further includes transmitting the encoded planar image, the transmitted encoded planar image characterized by a higher quality for a given bitrate as compared with the transmission of the planar image using an encoding process that applies a uniform encoding quality to the planar image.

In a third aspect, an imaging system for providing imaging content is disclosed. In one embodiment, the imaging system includes an optical element characterized by a spherical field of view; an imaging sensor optically coupled to the optical element, the imaging sensor configured to obtain a source image; a communications interface configured to communicate a representation of the source image; and one or more physical processors configured to execute a plurality of computer readable instructions, the plurality of computer readable instructions when executed by the one or more physical processors is configured to: transform the source image into a planar image using a spherical to planar transformation; obtain a spatial quality distribution for image encoding based on the spherical to planar transformation; encode the planar image using the spatial quality distribution such that: one or more portions of the planar image are encoded at a first quality; one or more portions of the planar image are encoded at a second quality, the second quality being greater than the first quality; and provide the encoded planar image via the communications interface to a target destination.

In one variant, the source images include panoramic content.

In another variant, the plurality of computer readable instructions when executed by the one or more physical processors is further configured to: receive a current viewport position via the communications interface for a user viewing the panoramic content; and provide the one or more other portions of the planar image at the second quality, the second quality being greater than the first quality, the one or more other portions of the planar image being representative of the current viewport position.

In yet another variant, the plurality of computer readable instructions when executed by the one or more physical processors is further configured to: provide the one or more portions of the planar image that are encoded at the first quality, the provision of the one or more portions configured to represent portions of the image that are not associated with the current viewport position for the user.

In yet another variant, the spherical to planar transformation comprises an equirectangular projection.

In yet another variant, the first quality and the second quality are effectuated by the utilization of a quantization parameter (QP) for the encoded planar image; and the second quality is characterized by a lower QP value as compared with a higher QP value for the first quality.

In yet another variant, the higher QP value is configured to reduce a transmission bitrate as compared with the transmission of a non-encoded planar image that does not utilize the spatial quality distribution.

In a fourth aspect, a computer readable storage apparatus is disclosed. In one embodiment, the computer readable storage apparatus includes computer readable instructions that when executed by a processing apparatus is configured to: access a planar image characterized by a spatially varying image distortion parameter; obtain a spatial quality distribution for encoding of the planar image based on the spatially varying image distortion parameter; and encode the planar image using the spatial quality distribution such that: one or more portions of the planar image are encoded at a first quality; one or more other portions of the planar image are encoded at a second quality, the second quality being greater than the first quality.

Other features and advantages of the present disclosure will immediately be recognized by persons of ordinary skill in the art with reference to the attached drawings and detailed description of exemplary implementations as given below.

Figure 1A:
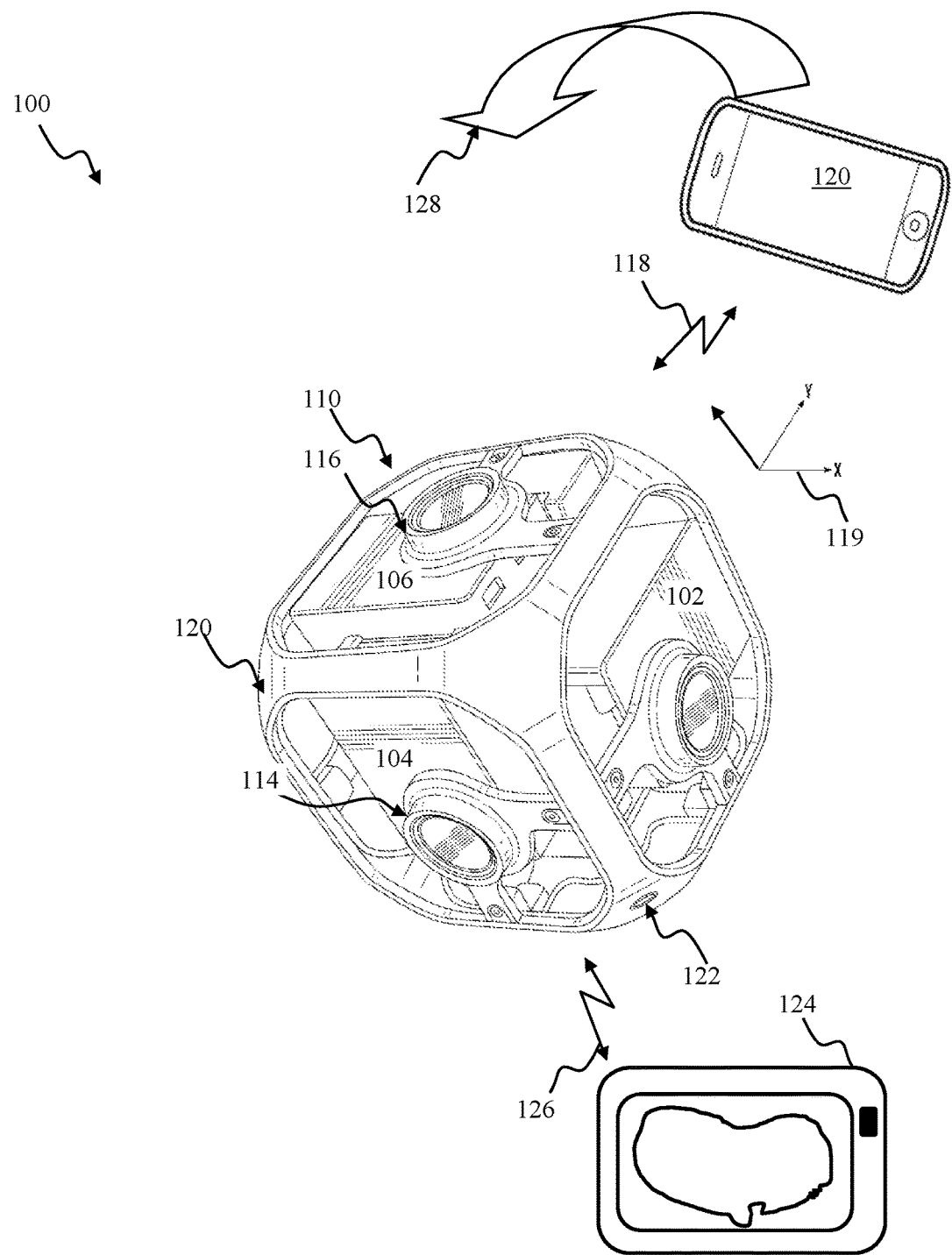
FIG. 1A illustrates a system for content capture and viewing in accordance with the principles of the present disclosure.

All Figures disclosed herein are ©Copyright 2017 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations are possible by way of interchange of or combination with some or all of the elements described or illustrated elements. Wherever convenient, the same reference numbers will be used throughout the drawings to refer to the same or similar parts.

Systems and methods for encoding imaging content using windowed spatial quality mapping are provided.

Panoramic content (e.g., content captured using a 180 degree field of view, a 360-degree view field and/or other fields of view) and/or virtual reality (VR) content, may be characterized by a high image resolution (e.g., 8192 pixels by 4096 pixels (8K)) and/or high bit rates (e.g., 100 megabits per second (mbps)). Imaging content characterized by full circle coverage (e.g., 180°×360° field of view) may be referred to as spherical content. Presently available standard video compression codecs, e.g., H.264 (described in ITU-T H.264 (01/2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265, described in e.g., ITU-T Study Group 16—Video Coding Experts Group (VCEG)-ITU-T H.265, and/or ISO/IEC JTC 1/SC 29/WG 11 Motion Picture Experts Group (MPEG)—the HEVC standard ISO/IEC 23008-2:2015, each of the foregoing incorporated herein by reference in its entirety, and/or the VP9 video codec, described at e.g., http://www.webmproject.org/vp9, the foregoing incorporated herein by reference in its entirety), may prove non-optimal for providing panoramic and/or VR content to resource limited devices.

When viewing panoramic and/or VR content using a viewport, the server may send (and the decoder may decode) a portion of a high resolution video. The area where the user is looking may be in high resolution and rest of the image may be in low resolution. When the viewer moves his/her viewport, the decoder may ask the server to transmit video data corresponding to the updated viewpoint. Using methodologies of the disclosure, the server may transmit new high resolution content for the new viewport position. The decoder may use existing (buffered) lower resolution content and combine it with the new high resolution content. Such approach may alleviate the need of transmitting one or more high resolution intra frames, reduce network congestion, and/or reduce energy use by, for example, the decoding device.

Panoramic, and/or virtual reality content may be viewed by a client device using a viewport into the extent of the panoramic image. In some implementations, viewing dimension(s) of the viewport may be configured smaller than the extent dimension(s) of the content (e.g., a viewport covering 1024 pixel wide by 1024 pixel in height area may be used to view content that was obtained over area 8192 pixels in width and 4096 pixels in height). Client device may include a portable media device characterized by given energy and/or computational resources.

Video content may be encoded using spatially varying encoding quality distribution (quality mapping). Spherical content may be obtained by a capture device characterized by multiple optical elements and/or image sensors (e.g., multi-camera device of FIG. 1A). One or more images (and/or portions thereof) obtained by individual cameras may be combined using a transformation operation. In some implementations, the transformation may include transformation from camera lens coordinates (e.g., a fisheye lens) to planar coordinates (e.g., equirectangular coordinates), in order to obtain, for example, an equirectangular panorama image. In the imaging arts, an equirectangular projection may be characterized for use in mapping a portion of the surface of a sphere to a planar surface. In some implementations, a cubic projection may be used to transform source images.

In some implementations an equirectangular projection may be used. In an equirectangular panoramic image, vertical elements may remain vertical; and the horizon may become a straight line across the middle of the image. Coordinates in the image may relate linearly to pan and tilt angles in the spherical coordinates. The poles (Zenith, Nadir) are located at the top and bottom edge and may be stretched to the entire width of the image. Areas near the poles may be stretched horizontally. Longitudinal distortion of the transformation may be used for encoding panoramic images. When encoding images characterized by a spatially varying distortion, spatially varying encoding quality parameters may be utilized. By way of a non-limiting example, an image portion near the equator (e.g., the middle of a latitudinal dimension of the image) may be characterized by lower distortion as compared to image portion(s) away from the equator (e.g., proximate poles). During encoding, image portions (e.g., macroblocks) proximate the equator may be encoded using one encoder parameter; image portions (e.g., macroblocks) proximate poles may be encoded using another encoder parameter.

In some implementations, encoder configuration may include modifications of encoding quality, encoder encoding time, and/or combinations thereof. Encoder configuration may be effectuated based on configuring one or more of quantization parameter (QP), quantization deadzone size, deblocking filter, and/or other in-loop filtering, decision of slice and/or tile boundaries, motion estimation search range and/or other parameters. In one or more implementations of encoding, the QP may vary in accordance with distance of a given position from the equator. Content delivery methodologies of the present disclosure may be utilized for facilitating virtual reality (VR) content delivery, video conferencing, immersive experience when viewing spherical (e.g., 360 degree content), and/or other applications.

Image encoding configured in accordance with the principles of the present disclosure may enable varying one or more encoding parameters across image in accordance with the transformation used to obtain the image (e.g., equirectangular transformation). Encoder parameter configuration may be used to improve video quality, reduced encoding time, reduce encoding computation and/or energy budget, and/or attain a combination thereof.

Some of the encoder parameters that can be used to improve video quality include quantization parameters (which may include, for example, QP or quantization deadzone size), deblocking or any in-loop filtering, decision of slice or tile boundaries or motion estimation search range. Some of the encoder parameters that can be used to gain encoding speed may include motion estimation search range, number of modes to search in mode decision, varying sub-pixel motion estimation operation and transform sizes to search during mode decision.

FIG. 1A illustrates a capture system configured for acquiring panoramic content, in accordance with one implementation. The system 100 of FIG. 1A may include a capture apparatus 110, such as, for example, a GoPro action camera, e.g., HERO4 Silver, and/or other image/video capture devices.

The capture apparatus 110 may include 6-cameras (e.g., 104, 106, 102) disposed in a cube-shaped cage 120. The cage 120 dimensions may be selected between 25 mm and 150 mm, (e.g., 105 mm in some implementations). The cage 120 may be outfitted with a mounting port 122 configured to enable attachment of the apparatus 110 to a supporting structure (e.g., tripod, photo stick). The cage 120 may provide a rigid support structure. Use of a rigid structure may ensure that orientation of individual cameras with respect to one another may remain at a given configuration during operation of the apparatus 110.

Individual capture devices (e.g., 102) may comprise a video camera device, such as described in, for example, U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety.

In some implementations, the capture device may include two camera components (including a lens and imaging sensors) that are disposed in a Janus configuration, such as described in, for example, U.S. patent application Ser. No. 29/548,661, entitled "MULTI-LENS CAMERA" filed on 15 Dec. 2015, the foregoing being incorporated herein by reference in its entirety.

The capture apparatus 110 may be configured to obtain imaging content (e.g., images and/or video) with a 360° field of view, also referred to as panoramic or spherical content, such as shown and described in, for example, U.S. patent application Ser. No. 14/949,786, entitled "APPARATUS AND METHODS FOR IMAGE ALIGNMENT" filed on 23 Nov. 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

Individual cameras (e.g., 102, 104, 106) may be characterized by a field of view of 120° in longitudinal dimension and 60° in latitudinal dimension. In order to provide for an increased overlap between images obtained with adjacent cameras, image sensors of any two adjacent cameras may be configured at 60° with respect to one another. By way of non-limiting illustration, longitudinal dimension of camera 102 sensor may be oriented at 60° with respect to the longitudinal dimension of the camera 104 sensor; longitudinal dimension of camera 106 sensor may be oriented at 60° with respect to longitudinal dimension 116 of the camera 104 sensor. The camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens such as, for example, lens 114 of the camera 104, lens 116 of the camera 106. In some implementations, the individual lens may be characterized by what is referred to as fisheye pattern and produce images characterized by a fish eye (or near-fish eye) field of view (FOV). Images captured by two or more individual cameras of the apparatus 110 may be combined using stitching of fisheye projections of captured images to produce an equirectangular planar image, in some implementations, e.g., such as shown in U.S. patent application Ser. No. 14/920,427 entitled "APPARATUS AND METHODS FOR EMBEDDING METADATA INTO VIDEO STREAM" filed on 22 Oct. 2015, incorporated supra.

The capture apparatus 110 may house one or more internal metadata sources, e.g., video, inertial measurement unit, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct. 2015, incorporated supra. The capture apparatus 110 may comprise one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementation, the capture apparatus 110 may be configured to provide panoramic content (or portion thereof) to the device 120 for viewing.

In one or more implementations, individual links 126, 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, individual links 126, 118 may be effectuated using a wired interface, e.g., HDMI, USB, digital video interface, display port interface (e.g., digital display interface developed by the Video Electronics Standards Association (VESA), Ethernet, Thunderbolt), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct. 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementations, the user interface device 120 may communicate additional information (e.g., metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. By way of an illustration, a user may rotate (e.g., sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
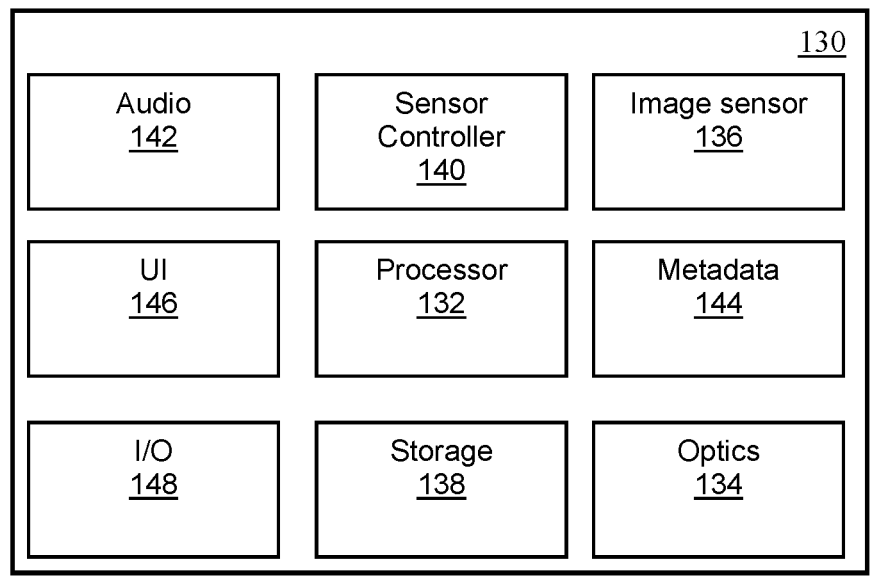
FIG. 1B is a functional block diagram illustrating a capture device for use with, for example, the system of FIG. 1A in accordance with the principles of the present disclosure.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130 via, for example, a bus. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element and the first image sensor may be embodied in a housing.

In some implementations, the image sensor module 136 may include, without limitation, video sensors, audio sensors, capacitive sensors, radio sensors, vibrational sensors, ultrasonic sensors, infrared sensors, radar, LIDAR and/or sonars, and/or other sensory devices.

The apparatus 130 may include one or more audio components (e.g., microphone(s) embodied within the camera (e.g., 142)). Microphones may provide audio content information.

The apparatus 130 may include a sensor controller module 140. The sensor controller module 140 may be used to operate the image sensor 136. The sensor controller module 140 may receive image or video input from the image sensor 136; audio information from one or more microphones, such as 142. In some implementations, audio information may be encoded using audio coding format, e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www.digitalbrainstorming.ch/db_data/eve/ambisonics/text01.pdf, the foregoing being incorporated herein by reference in its entirety.

The apparatus 130 may include one or more metadata modules embodied (e.g., 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content.

Metadata module 144 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144.

The sensor controller module 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller module 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard).

The apparatus 130 may include electronic storage 138. The electronic storage 138 may comprise a system memory module that is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processor 132 may interface to the sensor controller module 140 in order to obtain and process sensory information for, e.g., object detection, face tracking, stereo vision, and/or other tasks.

The processor 132 may interface with the mechanical, electrical sensory, power, and user interface 146 modules via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 130 may include user interface (UI) module 146. The UI module 146 may comprise any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other network interfaces) configured to communicate to one or more external devices (e.g., devices 124, 122, 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the apparatus 130 may include one or more connections to external computerized devices to allow for, inter alfa, configuration and/or management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

Figure 2:
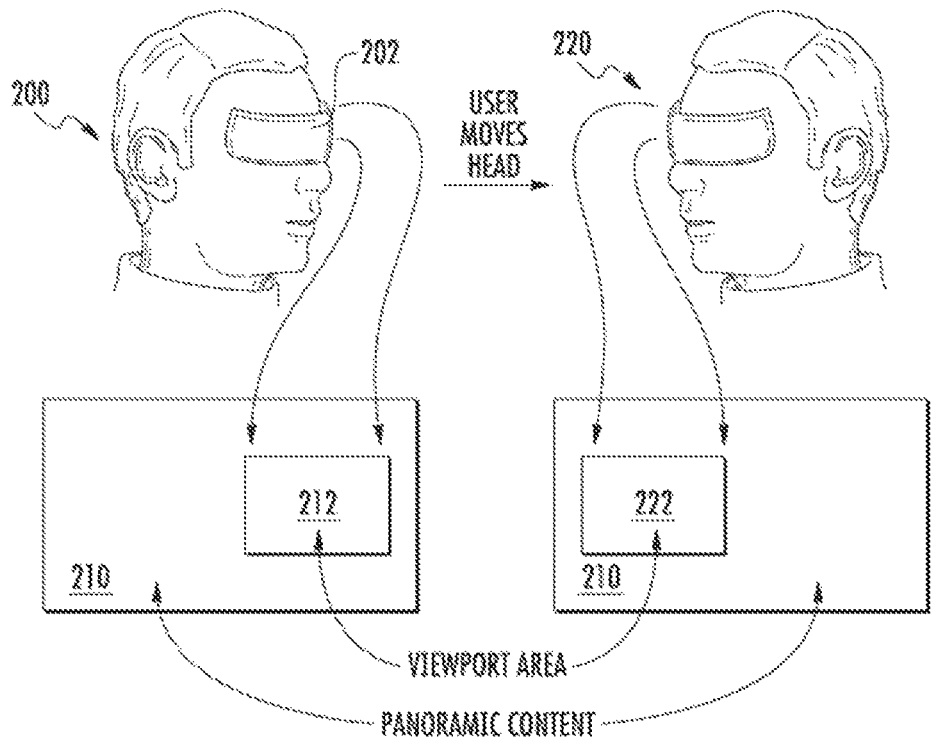
FIG. 2 is a graphical illustration depicting viewport change when viewing panoramic content in accordance with the principles of the present disclosure.

FIG. 2 illustrates viewport change when viewing panoramic content, in accordance with one implementation. In some implementations a user may view panoramic content using a virtual reality (VR) headset, 202 in FIG. 2. Headset 202 may include a sensor component configured to provide information related to orientation and/or motion of headset 202. In some implementations, the sensor component may include an accelerometer, a tilt sensor, a compass, a heading sensor, a gyroscope, and/or other sensors.

When headset 202 is pointing in a given direction, e.g., as shown in panel 200 in FIG. 2, the viewport associated with the position of headset 202 may be denoted by area 212 within the panoramic image frame 210. As used herein the terms "viewport" and/or "view area" may be used to describe a portion of view field that may be used for viewing panoramic content that may be characterized by content view field (e.g., shown by frame 210 in FIG. 2). When panoramic content is presented on a two dimensional display device, the viewport may denote a two dimensional area (e.g., 212) within the 2-dimensional projection of the acquired panoramic content (frame 210).

When providing a portion of the panoramic content (e.g., viewport 212) to a client device, a portion of the content corresponding to the present viewport may be encoded, transmitted, and/or decoded to reduce load on a content server, transmission resource (e.g., bandwidth, energy) utilization, and/or client device decoder load. Viewport changes may necessitate content bitstream adjustment. By way of an illustration, as head of the user moves from configuration 200 to configuration 220 in FIG. 2, the viewport may change, e.g., from area 212 to area 222 within the panoramic content frame 210. Accordingly, the content providing entity (e.g., content server) may need to transition from providing bitstream from content within the area 212 to content associated with the area 222.

Figure 3:
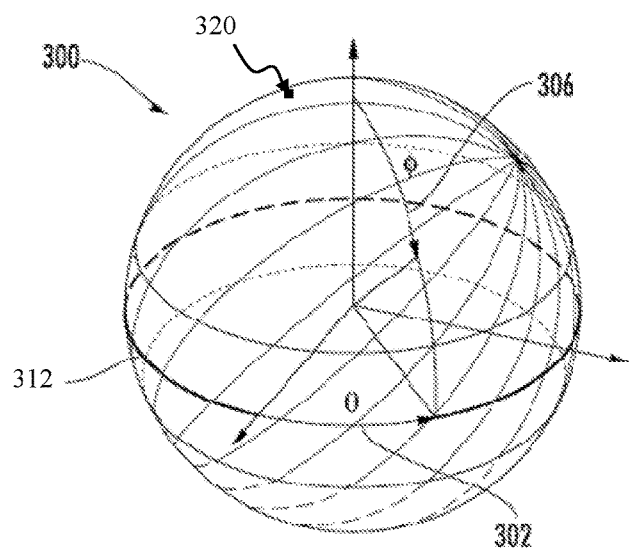
FIG. 3 is a plot depicting a spherical coordinate system useful for characterizing, for example, panoramic content in accordance with the principles of the present disclosure.

FIG. 3 illustrates a spherical coordinate system useful for characterizing image transformation of the disclosure in accordance with one implementation. Spherical angle θ, denoted by arrow 302 in FIG. 3 may be used to denote location of a pixel along the iso-line 312 in FIG. 3. Spherical angle φ, denoted by arrow 306 in FIG. 3 may be used to denote a location away from the iso-line 312.

Figure 4:
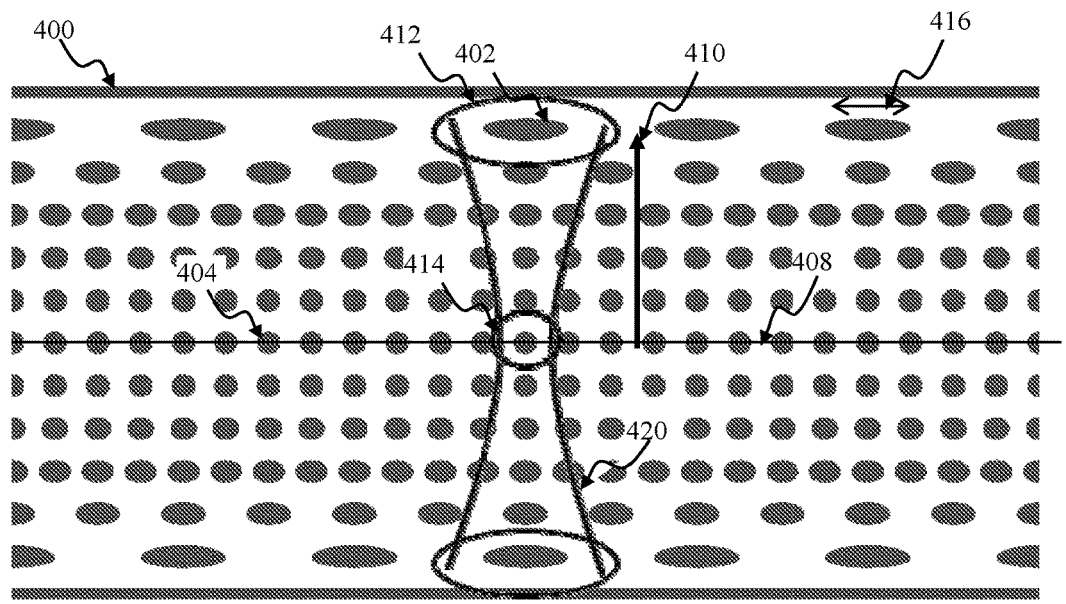
FIG. 4 is a graphical illustration depicting the spatial distribution of image encoding quality parameters for use with various ones of the encoding methodologies in accordance with the principles of the present disclosure.

FIG. 4 illustrates a distortion of equirectangular transformation and a spatial distribution of image encoding quality for use with encoding methodology of the disclosure, in accordance with one implementation.

Panel 400 may represent an equirectangular image. Solid shapes (ellipses and/or circles 402, 404) may characterize distortion associated with the transformation projection of spherical field of view onto an image plane. In some implementations, the shapes 402, 404 may be referred to as the Tissot indicatrices and/or ellipse of distortion. As may be seen from FIG. 4, as latitude increases (e.g., distance 410 from the equatorial line 408), width 416 of the distortion ellipse increases. Increased distortion near poles (e.g., ellipse 402) may correspond to a given pixel in the source image (e.g., pixel 320 in FIG. 3) being distorted (e.g., stretched) to occupy a greater extent within the equirectangular image, compared to the extent of the pixel 320 within the source image. Image transformation may not provide additional information. In some implementations, encoding of transformed images (e.g., such as shown by frame 400 in FIG. 4 and/or 520 in FIG. 5) may be configured such that encoding quality may be configured to vary within the image. By way of an illustration, encoding of image portion (e.g., 414) proximate equator (e.g., line 408 in FIG. 4) may be configured at a quality that may be greater compared to encoding quality of regions (e.g., 412) near the polar regions. In some implementations, encoding quality may be effectuated by adapting quantization parameter (QP) of encoder. In FIG. 4, QP variation may be represented by curve 420 such that image areas closer to the equator may be encoded using lower QP values (higher quality); image areas closer to the poles may be encoded using greater QP values (lower quality).

Figure 5:
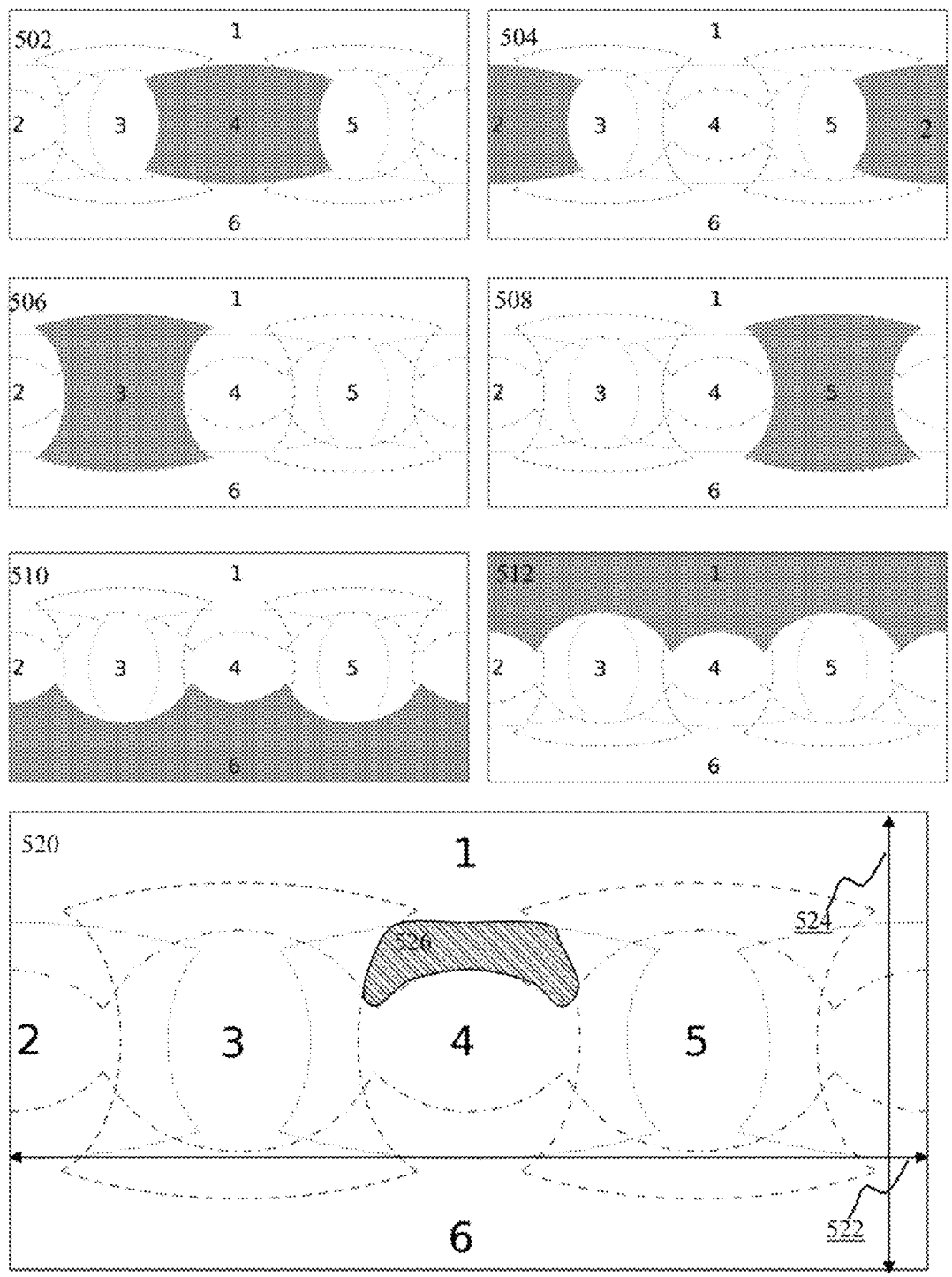
FIG. 5 is a plot depicting a projection of a camera field of view of a source camera onto an equirectangular space in accordance with the principles of the present disclosure.

FIG. 5 illustrates projection of fields of view of source camera onto equirectangular space in accordance with one implementation. Panels 502, 504, 506, 508, 510, 512 in FIG. 5 depict projections of field of views of individual cameras of, e.g., capture apparatus 110 of FIG. 1A onto an equirectangular plane. Panel 520 illustrates a combined equirectangular image comprising overlapping transformed images obtained by the six cameras. For a horizontally oriented capture device 110 (e.g., (XY) plane denoted by arrows 119 in FIG. 1A disposed horizontally), notation in FIG. 5 may be expressed as follows:

panel 502 may denote field of view 4 corresponding to a forward looking camera, e.g., camera 102 in FIG. 1A;
panel 504 may denote field of view 2 of rearward looking camera;
panel 506 may denote field of view 3 of leftward looking camera;
panel 508 may denote field of view 5 of rightward looking camera, e.g., camera 104 in FIG. 1A;
panel 510 may denote field of view 6 of downward looking camera; and
panel 512 may denote field of view 1 of upward looking camera, e.g., 106 in FIG. 1A.

In some implementations of obtaining spherical (also referred to as 360°) image and/or video content, the combined (composite) image (e.g., occupying rectangular area of panel 520) may be characterized by greater coverage of the visual scene (wider field of view) as compared to a given component (source) image (areas denoted by broken curves and labeled by numbers 1,2,3,4,5,6 in panel 520). By way of an illustration, forward looking camera of the apparatus 110 may be characterized by field of view labeled 4 in panel 520 and may produce a component image that may cover 120° in horizontal plane and 90° in vertical plane. The combined image shown by the rectangle 520 may cover a 360°×180° sphere. Dimensions of image in panel 520 may be characterized by a ratio of two to one (e.g., dimension 522 over dimension 524 in FIG. 5). In one or more implementations, one or more of the component (source) images may be characterized by one or more image characteristic configured different from one or more of other source images. By way of a non-limiting illustration, one source image (e.g., an image of a person's face) may be characterized by greater resolution compared to another source image (e.g., image of a background). It will be recognized by those skilled in the arts that various other image characteristics may be configured for individual source images, including but not limited to lens aperture, exposure value, depth of focus, color content, image sharpness, saturation, white balance, field of view, resolution, image size, lens type (e.g., fisheye, rectilinear), and/or other parameter.

Figure 6A:
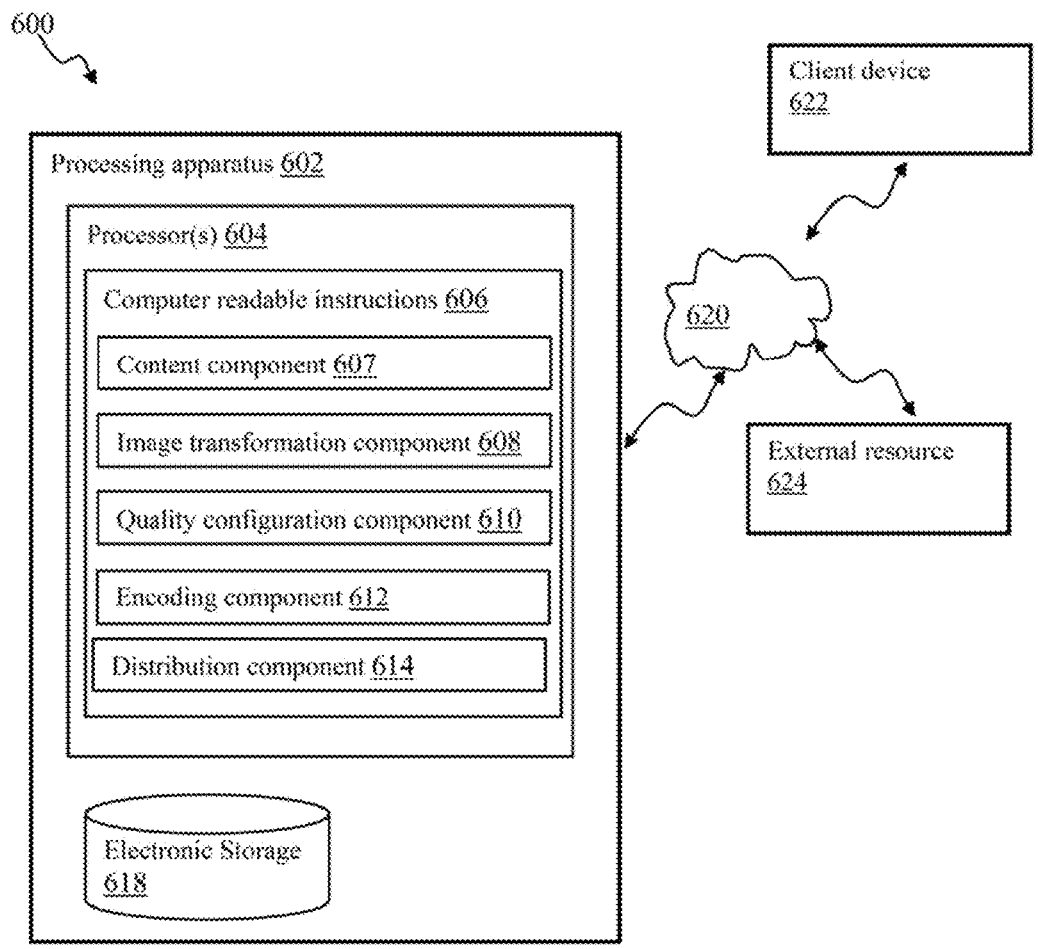
FIG. 6A is a functional block diagram illustrating a system for providing content using quality mapping methodology in accordance with the principles of the present disclosure.

FIG. 6A illustrates a computerized system for providing content using quality mapping methodology, in accordance with one implementation. In some implementations, the system 600 may be configured to provide encoded content during content acquisition by a capture device (e.g., 110 of FIG. 1A). In one or more implementations, the system 600 may be configured to provide the content using previously acquired content.

The system 600 of FIG. 6A may include a processing apparatus 602 (e.g., including capture device 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The processing apparatus 602 may be in operable communication with one or more remote client devices 622 via one or more electronic communications interface 620. The electronic communications interface 620 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the electronic communications interface 620 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the electronic communications interface 620 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The remote device 622 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), and/or other device configured to communicate information with the processing apparatus 602. In some implementations, the system 600 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct. 2015, incorporated supra.

The processing apparatus 602 may include one or more physical processors 604 configured by machine-readable instructions 606 and/or other components. Executing the machine-readable instructions 606 may cause the one or more physical processors 604 to effectuate encoding of content using methodology of the disclosure. The machine-readable instructions 606 may include one or more of content component 607, an image transformation component 608, a quality configuration component 610, an encoding component 612, a distribution component 614, and/or other components.

One or more features and/or functions of the processing apparatus 602 may be facilitation of video content acquisition, generation and/or provision of content. It is noted that although the present disclosure is directed to videos and/or video clips, one or more other implementations of system 600 and/or processing apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The processing apparatus 602 may include communication lines or ports to enable the exchange of information with a network and/or other entities. Illustration of processing apparatus 602 in FIG. 6A is not intended to be limiting. The processing apparatus 602 may include a plurality of hardware, software, and/or firmware components operating together to provide the functionality attributed herein to processing apparatus 602. For example, the processing apparatus 602 may be implemented by a cloud of computing platforms operating together as processing apparatus 602.

The processing apparatus 602 may include electronic storage 618. Electronic storage 618 may comprise electronic storage media that electronically stores information. The electronic storage media of electronic storage 618 may include one or both of system storage that is provided integrally (i.e., substantially non-removable) with processing apparatus 602 and/or removable storage that is removably connectable to processing apparatus 602 via, for example, a port or a drive. A port may include a USB port, a Firewire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from processing apparatus 602, information received from external resource (s), and/or other information that enables processing apparatus 602 to function as described herein.

The system 600 may include an external resource(s) 624 operatively linked via one or more electronic communications interface 620. External resource(s) 624 may include sources of information, hosts, and/or other entities outside of system 600, external entities participating with system 600, computing platforms, and/or other resources. In some implementations, some or all of the functionality attributed herein to external resource(s) 624 may be provided by resources included in system 600.

It will be appreciated that this is not intended to be limiting and that the scope of this disclosure includes implementations in which processing apparatus 602, external resources 624, and/or other entities may be operatively linked via some other communication media.

Processor(s) 604 may be configured to provide information-processing capabilities in processing apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6A as a single entity, this is for illustrative purposes only. In some implementations, processor 604 may include one or more processing units. These processing units may be physically located within a given device; the processor 604 may represent processing functionality of a plurality of devices operating in coordination. The processor 604 may be configured to execute components 607, 608, 610, 612, and/or 614. Processor 604 may be configured to execute components 607, 608, 610, 612, and/or 614 by software; hardware; firmware; some combination of software, hardware, and/or firmware; and/or other mechanisms for configuring processing capabilities on processor 604.

It should be appreciated that although components 607, 608, 610, 612, and/or 614 are illustrated in FIG. 6A as being co-located within a single processing unit, in implementations in which processor 604 includes multiple processing units, one or more of components 607, 608, 610, 612, and/or 614 may be located remotely from the other components. The description of the functionality provided by the different 607, 608, 610, 612, and/or 614 described above is for illustrative purposes and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6A, the content component 607 may be configured to access and/or manage image and/or audio content. In some implementations, the content component 607 may be configured to effectuate image/audio content acquisition using any applicable methodologies including those described herein. By way of an illustration, the content component 607 may be operable to instantiate content acquisition by the capture device 110 based on a timer event, user instruction, or a sensor event. In one or more implementations, the content component 607 may be operable effectuate content acquisition by a VR headset, e.g., such as shown in FIG. 2. In some implementations, the content component 607 may be operable to access previously acquired content from, e.g., electronic storage 618 and/or external resource (e.g., external storage, and/or remote user device during content upload). The operations performed by the content component 607 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "METADATA CAPTURE APPARATUS AND METHODS" filed on 19 Jan. 2016, the foregoing being incorporated herein by reference in its entirety).

In FIG. 6A image transformation component 608 may be configured to effectuate transformation of one or more source images. In some implementations, the image transformation may include applying lens-specific to target specific transformation (e.g., fisheye to equirectangular, fisheye to cube and/or other transformations). In one implementation, the image transformation component 607 may be configured to obtain image of panel 520 based on source images 502, 504, 506, 508, 510, 512 of FIG. 5.

In FIG. 6A, quality configuration component 610 may be configured to effectuate obtaining a spatial quality distribution map for image encoding. In some implementations of equirectangular image encoding, image encoding parameter may be configured to vary within an image frame. By way of a non-limiting illustration, a portion of an image (e.g., portion 414 in FIG. 4) proximate an equator (e.g., denoted by line 408 in FIG. 4) may be encoded using quality configured greater than quality used for encoding a portion of an image (e.g., portion 412 in FIG. 4) distant from the equator. By way of another non-limiting illustration, a portion of an image (e.g., portion 412 in FIG. 4) may be encoded using faster encoding time compared to encoding time used for encoding a portion of an image (e.g., portion 414 in FIG. 4) proximate equator. In some implementations, encoding parameter may be characterized by a QP value. When encoding a given image portion (e.g., macroblock) the QP parameter may be configured based on distance from the macroblock location to a reference location within the image (e.g., distance 410 to the equator 408 in FIG. 4). In one or more implementations, QP may be configured to increase linearly, parabolically, quadratically, sinusoidally, exponentially, using a combination thereof with distance from the reference location and/or using other configurations (e.g., a pre-determined set of discrete QP values, e.g., 1, 2, 3, 4, 7, 12, 20, 33, 55).

In FIG. 6A, encoding component 612 may be configured to encode an image using encoding quality configured based on image transformation characteristic. In some implementations, the encoding may include H.264, H.265 encoding operation wherein QP parameter may be configured to vary spatially in accordance with curve 420 of FIG. 4

In FIG. 6A, a distribution component 614, may be configured to provide the content. The content provision may include storing the content on the electronic storage 618 for viewing; broadcasting content, and/or otherwise delivering content to one or more client devices (e.g., the remote device 622 (e.g., smartphone) and/or external resource (e.g., cloud storage)), and/or other operations.

Figure 6B:
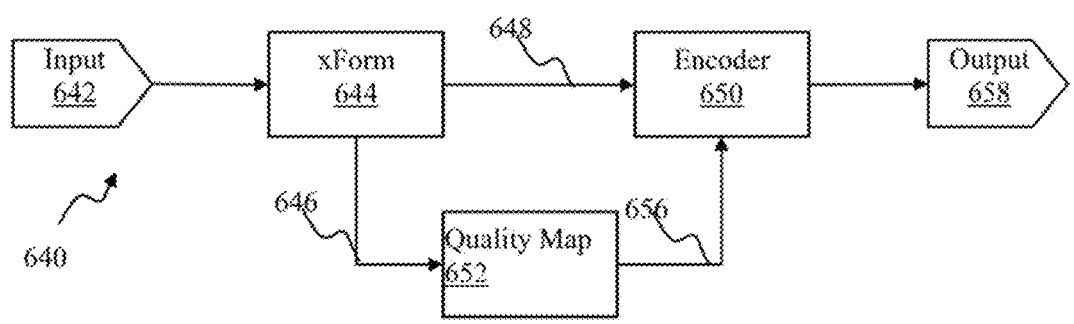
FIG. 6B is a functional block diagram illustrating an apparatus for encoding content using a quality mapping methodology in accordance with the principles of the present disclosure.

FIG. 6B illustrates an apparatus for encoding content using quality mapping methodology, in accordance with one implementation.

The apparatus 640 of FIG. 6B may include an image transformation component 644 configured to transform image input 642. In some implementations, the input 642 may include one or more images obtained with a capture device (e.g., images shown and described with respect to FIG. 5 obtained using capture device 110 and/or 130 of FIGS. 1A-1B). The transformation component 644 may include stitching and projection conversion to equirectangular, cubic, and/or other transformation operations configured to obtain panoramic image (e.g., planar image 520 of FIG. 5).

The transformed input 648 may be encoded. Transformation information 646 may be utilized in order to configure quality map 652 for use by encoder 650. In some implementations, the transformation information may include image transformation distortion, e.g., characterized using ellipse of distortion (Tissot's indicatrix), shown by solid ellipses in FIG. 4. In some implementations, encoding quality may be configured based on a QP parameter. For a macroblock at a given location within an image, the QP may be configured based on distance from the macroblock location to a reference location within the image (e.g., distance 410 to the equator 408 in FIG. 4). In one or more implementations, QP may be configured to increase linearly, parabolically, quadratically, sinusoidally, exponentially, using a combination thereof with distance from the reference location and/or using other configurations (e.g., a pre-determined set of discrete QP values increasing from 1 to 55).

Encoding quality map 656 may be provided to the encoder 650. The encoder 650 may include H.264, H.265 encoding operation wherein QP parameter may be configured to vary spatially in accordance with curve 420 of FIG. 4.

Output 658 of the encoder 650 that is configured using the encoding quality map 656 may be characterized by a lower bitrate for a given quality and/or better quality for a given bitrate as compared to an encoding process that may apply a uniform encoding quality.

Figure 7:
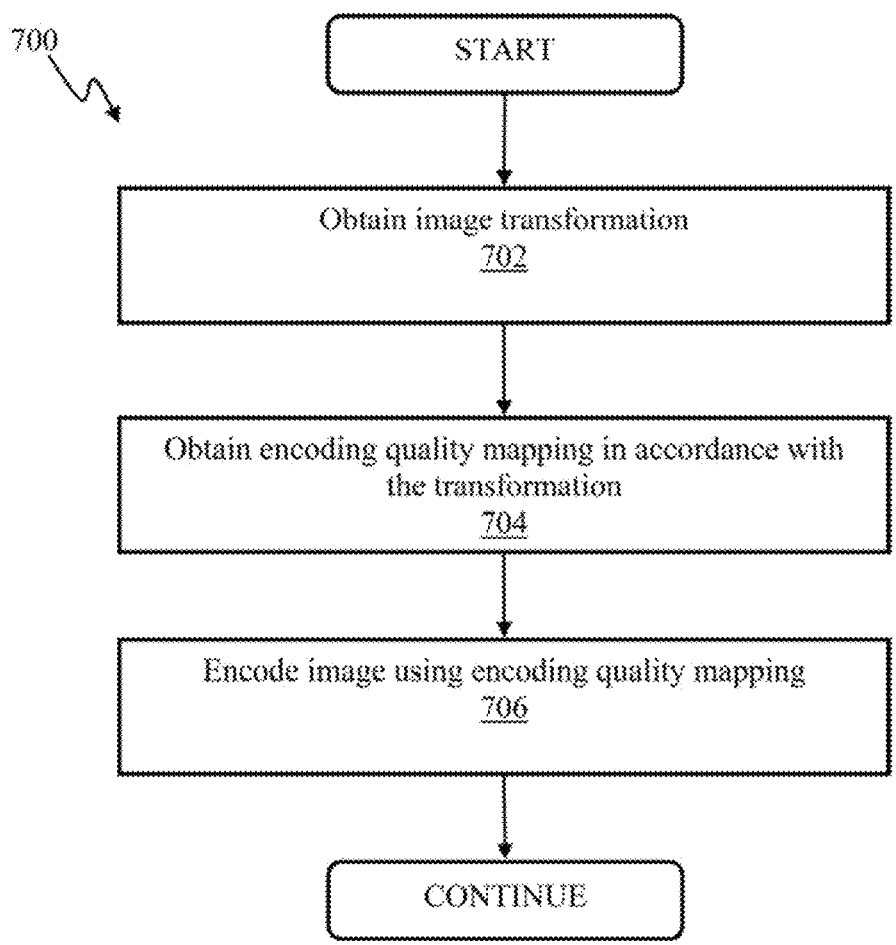
FIG. 7 is a logical flow diagram illustrating a method of image encoding using quality mapping in accordance with the principles of the present disclosure.

FIG. 7 illustrates method 700 for encoding imaging content in accordance with some implementations of the present disclosure. Imaging content may be encoded using quality mapping in accordance with one implementation of the present disclosure. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700. Operations of method 700 may be effectuated by one or more devices and/or computerized systems including these described with respect to FIGS. 1A-1B and/or FIGS. 6A-6B. Method 700 of FIG. 7 may be implemented by, e.g., system 600 of FIG. 6A.

At operation 702 of method 700, image transformation may be obtained. The image transformation operation 702 may include transformation of one or more source images. In some implementations, the image transformation may include applying lens-specific to target specific transformation (e.g., fisheye to equirectangular, fisheye to cube and/or other transformations). In one implementation, the image transformation component 607 may be configured to obtain image of panel 520 based on source images 502, 504, 506, 508, 510, 512 of FIG. 5.

At operation 704 of method 700, encoding quality mapping for the transformation of operation 702 may be obtained. Encoding quality configuration may be effectuated to obtain a spatial quality distribution map for image encoding. In some implementations of equirectangular image encoding, image encoding quality may be configured to vary within an image frame. By way of a non-limiting illustration, a portion of an image (e.g., portion 414 in FIG. 4A) proximate an equator (e.g., denoted by line 408 in FIG. 4A) may be encoded using quality configured greater than quality used for encoding a portion of an image (e.g., portion 412 in FIG. 4A) distant from the equator. In some implementations, encoding quality may be characterized by a QP parameter. When encoding a given image portion (e.g., macroblock) the QP parameter may be configured based on distance from the macroblock location to a reference location within the image (e.g., distance 410 to the equator 408 in FIG. 4A). In one or more implementations, QP may be configured to increase linearly, parabolically, quadratically, sinusoidally, exponentially, using a combination thereof with distance from the reference location and/or using other configurations (e.g., a pre-determined set of discrete QP values, e.g., within range from 1 to 55).

At operation 706, transformed image may be encoded using encoding quality mapping obtained at operation 704. Output of the encoding operation 706 (that is configured using the encoding quality mapping) may be characterized by a lower bitrate for a given quality and/or better quality for a given bitrate as compared to an encoding process that may apply a uniform encoding quality.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "wireless" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A system for providing imaging content, the system comprising:
    an electronic storage configured to store a sequence of images of a first frame resolution;
    a communications interface configured to communicate a bit stream associated with the stored sequence of images to a client device; and
    one or more physical processors configured to execute a plurality of computer readable instructions, the plurality of computer readable instructions configured to, when executed by the one or more physical processors, cause the system to:
    access one or more source images, individual source images of the one or more source images characterized by a spherical field of view;
    transform the one or more source images into a planar image using a spherical to planar transformation;
    obtain a fixed spatial quality distribution map for image encoding based on the spherical to planar transformation, the fixed spatial quality distribution map comprising at least a plurality of encoding parameters continuously varying along a curve relative to an equatorial line associated with the planar image; and
    encode the planar image using the fixed spatial quality distribution map such that:
        one or more first portions of the planar image are encoded at a first quality according to a first one of the plurality of encoding parameters; and
        one or more second portions of the planar image are encoded at a second quality according to a second one of the plurality of coding parameters, the one or more second portions of the planar image being more proximate to an equatorial line associated with the planar image as compared to the one or more first portions of the planar image, the second quality being greater than the first quality.

2. The system of claim 1, wherein the spherical to planar transformation comprises an equirectangular projection.

3. The system of claim 2, wherein the equatorial line resides near the middle of a latitudinal dimension of the planar image.

4. The system of claim 3, wherein:
    the plurality of encoding parameters comprises a plurality of quantization parameter (QP) values for the encoding of planar image; and
    the second quality is characterized by a lower QP value as compared with a higher QP value for the first quality.

5. The system of claim 4, wherein the one or more source images are obtained using a plurality of image capturing devices, the plurality of image capturing devices are configured to obtain panoramic content.

6. The system of claim 5, wherein the higher QP value is configured to reduce a transmission bitrate as compared with the transmission of a non-encoded planar image that does not utilize the spatial quality distribution map for encoding.

7. The system of claim 1, wherein the one or more source images are obtained using a plurality of image capturing devices, the plurality of image capturing devices are configured to obtain panoramic content.

8. The system of claim 7, wherein the plurality of computer readable instructions is further configured to, when executed by the one or more physical processors, cause the system:
receive a first current viewport position for a user viewing the obtained panoramic content; and
provide the one or more second portions of the planar image at the second quality, the first quality; the one or more second portions of the planar image representative of the current viewport position.

9. The system of claim 8, wherein the one or more first portions of the planar image that are encoded at the first quality represent portions of the image that are not associated with the current viewport position for the user.

10. A method for providing imaging content, the method comprising:
accessing a planar image characterized by a spatially varying image distortion parameter;
obtaining a spatial quality distribution map for encoding of the planar image based on the spatially varying image distortion parameter, the spatial quality distribution map comprising at least a plurality of quantization parameter (QP) values each associated with one or more of a plurality of positions within the planar image, the plurality of QP values varying along a curve relative to an equatorial line disposed at a central latitudinal dimension of the planar image; and
encoding the planar image using the spatial quality distribution map such that:
one or more first portions of the planar image are encoded at a first quality according to a first QP value, the one or more first portions corresponding to one or more first ones of the plurality of positions;
one or more second portions of the planar image are encoded at a second quality according to a second QP value, the one or more second portions corresponding to one or more second ones of the plurality of positions, the one or more first ones of the plurality of positions distal to the equatorial line relative to the one or more second ones of the plurality of positions, the second quality being greater than the first quality.

11. The method of claim 10, further comprising:
obtaining one or more source images; and
transforming the one or more source images into the planar image.

12. The method of claim 11, further comprising transmitting the encoded planar image, the transmitted encoded planar image characterized by a lower bitrate for a given quality as compared with transmission of the planar image using an encoding process that applies a uniform encoding quality to the planar image.

13. The method of claim 11, further comprising transmitting the encoded planar image, the transmitted encoded planar image characterized by a higher quality for a given bitrate as compared with transmission of the planar image using an encoding process that applies a uniform encoding quality to the planar image.

14. An imaging system for providing imaging content, the apparatus comprising:
an optical element characterized by a spherical field of view;
an imaging sensor optically coupled to the optical element, the imaging sensor configured to obtain a source image;
a communications interface configured to communicate a representation of the source image; and
one or more physical processors configured to execute a plurality of computer readable instructions, the plurality of computer readable instructions configured to, when executed by the one or more physical processors, cause the imaging system to:
obtain, via the imaging sensor, the source image;
during the obtainment of the source image:
transform the source image into a planar image using a spherical to planar transformation;
obtain a fixed spatial quality distribution map for image encoding based on the spherical to planar transformation, the fixed spatial quality distribution map comprising at least data related to spatial distribution relative to a fixed reference line within the planar image, the spatial distribution utilized to identify an encoding quality;
utilize the fixed spatial quality distribution map to encode one or more first portions of the planar image according to a first quality; and
utilize the spatial quality distribution map to encode one or more second portions of the planar image according to a second quality, the second quality being greater than the first quality, the one or more second portions being more proximate to the fixed reference line as compared with the one or more first portions; and
provide the encoded planar image via the communications interface to a target destination.

15. The imaging system of claim 14, wherein the source images comprises panoramic content.

16. The imaging system of claim 14, wherein the spherical to planar transformation comprises an equirectangular projection.

17. The imaging system of claim 16, wherein:
the first quality and the second quality are effectuated by the utilization of a quantization parameter (QP) for the encoded planar image; and
the second quality is characterized by a lower QP value as compared with a higher QP value for the first quality.

18. The imaging system of claim 17, wherein the higher QP value is configured to reduce a transmission bitrate as compared with the transmission of a non-encoded planar image that does not utilize the fixed spatial quality distribution map for encoding.

19. The imaging system of claim 14, wherein the encode of the one or more first portion at the first quality and the encode of the one or more second portions at the second quality occurs prior to receipt of data indicative of a direction of interest from a computerized user device.

20. The imaging system of claim 14, wherein the plurality of computer readable instructions is further configured to, when executed by the one or more physical processors, cause the imaging system to:

receive a current viewport position via the communications interface for a user viewing the panoramic content; and provide the one or more first portions of the planar image at the first quality, the one or more first portions of the planar image being representative of the current viewport position.

* * * * *

UNITED STATES PATENT AND TRADEMARK OFFICE
CERTIFICATE OF CORRECTION

Page 1 of 4

PATENT NO.         : 10,484,621 B2
APPLICATION NO.    : 15/414403
DATED              : November 19, 2019
INVENTOR(S)        : Balineedu Chowdary Adsumilli et al.

It is certified that error appears in the above-identified patent and that said Letters Patent is hereby corrected as shown below:

In the Specification

Currently reads (Column 17, Lines 25 – 55):
"In FIG. 6A, the content component 607 may be configured
to access and/or manage image and/or audio content. In
some implementations, the content component 607 may be
configured to effectuate image/audio content acquisition
using any applicable methodologies including those
described herein. By way of an illustration, the content 30
component 607 may be operable to instantiate content
acquisition by the capture device 110 based on a timer event,
user instruction, or a sensor event. In one or more implementations,
the content component 607 may be operable
effectuate content acquisition by a VR headset, e.g., such as
shown in FIG. 2. In some implementations, the content
component 607 may be operable to access previously
acquired content from, e.g., electronic storage 618 and/or
external resource (e.g., external storage, and/or remote user
device during content upload). The operations performed by 40
the content component 607 may include information timestamping,
adjustment of data rate, transcoding, post processing
(e.g., adjusting white balance, sharpening, contrast,
gamma and/or other parameters), trimming, and/or other
operations. In some implementations, the image/audio content
and the metadata may be stored in a multimedia storage
container (e.g., MP4, MOY) such as described in detail in
U.S. patent application Ser. No. 14/920,427, entitled
"APPARATUS AND METHODS FOR EMBEDDING
METADATA INTO VIDEO STREAM" filed on 22 Oct.
2015, incorporated supra, and/or in a session container (e.g., Signed and Sealed this
Twenty-fifth Day of February, 2020

Andrei Iancu
*Director of the United States Patent and Trademark Office* such as described in detail in U.S. patent application Ser. No. 15/001,038, entitled "METADATA CAPTURE APPARATUSAND METHODS" filed on 19 Jan. 2016, the foregoing being incorporated herein by reference in its entirety)."

Should read:
-- In FIG. 6A, the content component 607 may be configured to access and/or manage image and/or audio content. In some implementations, the content component 607 may be configured to effectuate image/audio content acquisition using any applicable methodologies including those described herein. By way of an illustration, the content component 607 may be operable to instantiate content acquisition by the capture device 110 based on a timer event, user instruction, or a sensor event. In one or more implementations, the content component 607 may be operable effectuate content acquisition by a VR headset, e.g., such as shown in FIG. 2. In some implementations, the content component 607 may be operable to access previously acquired content from, e.g., electronic storage 618 and/or external resource (e.g., external storage, and/or remote user device during content upload). The operations performed by the content component 607 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOY) such as described in detail in U.S. patent application Ser. No. 14/920,427, entitled "APPARATUS AND METHODS FOR EMBEDDING METADATA INTO VIDEO STREAM" filed on 22 Oct. 2015, incorporated supra, and/or in a session container (e.g., such as described in detail in U.S. patent application Ser. No. 15/001,038, entitled "STORAGE OF METADATA AND IMAGES" filed on 19 Jan. 2016, each of the foregoing being incorporated herein by reference in its entirety). --

In the Claims

Currently reads (Claim 8 - Column 23, Lines 11 – 21):
"8. The system of claim 7, wherein the plurality of computer readable instructions is further configured to, when executed by the one or more physical processors, cause the system:

receive a first current viewport position for a user viewing the obtained panoramic content; and
provide the one or more second portions of the planar image at the second quality, the first quality; the one or more second portions of the planar image representative of the current viewport position."

Should read:
-- 8. The system of claim 7, wherein the plurality of computer readable instructions is further configured to, when executed by the one or more physical processors, cause the system to:
receive a first current viewport position for a user viewing the obtained panoramic content; and
provide the one or more second portions of the planar image at the second quality, the one or more second portions of the planar image representative of the current viewport position. --

Currently reads (Claim 10 - Column 23, Lines 26 – 54):
"10. A method for providing imaging content, the method comprising:
accessing a planar image characterized by a spatially varying image distortion parameter;
obtaining a spatial quality distribution map for encoding of the planar image based on the spatially varying image distortion parameter, the spatial quality distribution map comprising at least a plurality of quantization parameter (QP) values each associated with one or more of a plurality of positions within the planar image, the plurality of QP values varying along a curve relative to an equatorial line disposed at a central latitudinal dimension of the planar image; and
encoding the planar image using the spatial quality distribution map such that:
one or more first portions of the planar image are encoded at a first quality according to a first QP value, the one or more first portions corresponding to one or more first ones of the plurality of positions;
one or more second portions of the planar image are encoded at a second quality according to a second QP value, the one or more second portions corresponding to one or more second ones of the plurality of positions, the one or more first ones of the 50 plurality of positions distal to the equatorial line relative to the one or more second ones of the plurality of positions, the second quality being
greater than the first quality."

Should read:
-- 10. A method for providing imaging content, the method comprising:
accessing a planar image characterized by a spatially varying image distortion parameter;
obtaining a spatial quality distribution map for encoding of the planar image based on the spatially varying image distortion parameter, the spatial quality distribution map comprising at least a plurality of quantization parameter (QP) values each associated with one or more of a plurality of positions within the planar image, the plurality of QP values varying along a curve relative to an equatorial line disposed at a central latitudinal dimension of the planar image; and
encoding the planar image using the spatial quality distribution map such that:
one or more first portions of the planar image are encoded at a first quality according to a first QP value, the one or more first portions corresponding to one or more first ones of the plurality of positions; and
one or more second portions of the planar image are encoded at a second quality according to a second QP value, the one or more second portions corresponding to one or more second ones of the plurality of positions, the one or more first ones of the 50 plurality of positions distal to the equatorial line relative to the one or more second ones of the plurality of positions, the second quality being greater than the first quality. --